US011734652B2

(12) United States Patent
Hsu et al.

(10) Patent No.: US 11,734,652 B2
(45) Date of Patent: Aug. 22, 2023

(54) DEVICES FOR VEHICLE MESSAGE MANAGEMENT

(71) Applicant: ORANGE ELECTRONIC CO., LTD., Taichung (TW)

(72) Inventors: Chin-Yao Hsu, Taichung (TW); Hung-Chih Yu, Taichung (TW); Jia-Hao Bai, Taichung (TW)

(73) Assignee: ORANGE ELECTRONIC CO., LTD., Taichung (TW)

( * ) Notice: Subject to any disclaimer, the term of this patent is extended or adjusted under 35 U.S.C. 154(b) by 570 days.

(21) Appl. No.: 16/104,943

(22) Filed: Aug. 19, 2018

(65) Prior Publication Data
US 2020/0057999 A1 Feb. 20, 2020

(51) Int. Cl.
*G06Q 10/00* (2023.01)
*G06Q 10/20* (2023.01)
*H04L 67/306* (2022.01)
*G06Q 10/087* (2023.01)
*G06Q 30/0601* (2023.01)
*G06Q 10/30* (2023.01)
*G06K 7/14* (2006.01)
*H04B 1/38* (2015.01)
*G06V 20/62* (2022.01)

(52) U.S. Cl.
CPC .......... *G06Q 10/20* (2013.01); *G06Q 10/087* (2013.01); *G06Q 10/30* (2013.01); *G06Q 30/0633* (2013.01); *H04L 67/306* (2013.01); *G06K 7/1413* (2013.01); *G06K 7/1417* (2013.01); *G06V 20/62* (2022.01); *H04B 1/38* (2013.01)

(58) Field of Classification Search
CPC ...... G06Q 10/20; G06Q 10/30; G06Q 20/087; G06Q 30/0633; H04L 67/306; G06K 7/1413; G06K 7/1417; G06K 9/325; H04B 1/38

USPC ......................................................... 705/26.8
See application file for complete search history.

(56) References Cited

U.S. PATENT DOCUMENTS 9,050,862 B2 6/2015 Mouchet
9,454,707 B1* 9/2016 Tracy ....................... G06K 9/24
10,611,197 B2 4/2020 Yu
2002/0075145 A1 6/2002 Hardman et al.
(Continued)

FOREIGN PATENT DOCUMENTS

DE 112012004481 T5 7/2014
TW 201813835 A 9/2017
TW 201813835 A 4/2018

OTHER PUBLICATIONS

S. C. Ergen et al., The Tire as an Intelligent Sensor, Jul. 2009, IEEE Transactions on Comptuer-Aided Design of Integrated Circuits and Systems, vol. 28, No. 7, pp. 941-955. (Year: 2009).*

*Primary Examiner* — Allison G Wood
*Assistant Examiner* — Brittany E Bargeon
(74) *Attorney, Agent, or Firm* — Muncy, Geissler, Olds & Lowe, P.C.

(57) ABSTRACT

A vehicle message managing method includes: providing an operation message of a tire through a tire sensor; receiving the operation message through the tire sensor setting tool, or receiving at least one outer message through the tire sensor setting tool; transmitting at least one of the operation message and the outer message to a remote server; storing and analyzing at least one of the operation message and the outer message and generating an analyzing result.

11 Claims, 10 Drawing Sheets

(56) References Cited

U.S. PATENT DOCUMENTS

| | | | |
|---|---|---|---|
| 2003/0227379 A1* | 12/2003 | Itou | B60C 23/0479 |
| | | | 340/442 |
| 2008/0057929 A1 | 3/2008 | Min | |
| 2008/0316006 A1* | 12/2008 | Bauman | G07C 5/008 |
| | | | 340/425.5 |
| 2010/0225464 A1* | 9/2010 | Oda | B60C 23/0442 |
| | | | 340/459 |
| 2011/0153459 A1* | 6/2011 | Kirian | G06Q 10/06 |
| | | | 705/305 |
| 2012/0169856 A1* | 7/2012 | Ahmed | G06Q 10/08 |
| | | | 348/61 |
| 2014/0165026 A1 | 6/2014 | McIntyre et al. | |
| 2016/0325592 A1* | 11/2016 | Tomakidi | G01M 17/013 |
| 2017/0136834 A1 | 5/2017 | Chong et al. | |
| 2018/0093537 A1* | 4/2018 | Yu | G07C 5/008 |

\* cited by examiner

DEVICES FOR VEHICLE MESSAGE MANAGEMENT

TECHNICAL FIELD

The present disclosure relates to vehicle message managing device, vehicle message managing method and vehicle message managing system based on a tire sensor and a tire sensor setting tool. The present disclosure also relates to a method for setting a tire storing position and a method for setting a tire recycling using the aforementioned vehicle message managing device.

DESCRIPTION OF RELATED ART

Recently, the US government makes a compulsory legislation to indicate that the tire manufacturer or the tire brand vendor needs to record the tire buyer name, the tire seller name, the tire buyer address, the tire seller address and the tire ID (Identification). The man purpose is to trace the seller or the buyer of the tire. This is due to the tire needs to be replaced to a new one after five years, and the tire manufacturer or the tire brand vendor needs to recall the tire, therefore they needs to know the seller of the tire. The seller of the tire is commonly a tire agent or a tire retailer. It is also needs to know the buyer of the tire. The buyer of the tire is commonly a vehicle owner. Therefore, the tire manufacturer or the tire brand vendor needs to record the related data in a tire registration table. The tire registration table is explicitly provided to be kept at least five years. For complying with the regulations, the tire buyer and the tire seller need to record the table and send back to the tire manufacturer or the tire brand vendor. However, this procedure is miscellaneous. If the tire registration table is a hard copy, it takes a long time to send back the hard copy to the tire manufacturer or the tire brand vendor. Furthermore, the hard copy is required to be kept at least five years, thus it is not favorable for the environmental protection.

Furthermore, a tire is the most important component of a vehicle since it directly contacts the ground during the vehicle traveling. There is a statistical data showing that the bad condition of the tire is a key factor of car accidents. Therefore, real-time monitoring of the tire will be a key factor for avoiding traffic danger. A TPMS (Tire Pressure Monitoring System) has been reached to the market. The TPMS is used for monitoring the tire pressure during the tire traveling for providing a warning of a danger situation. The TPMS has two types: an indirect TPMS and a direct TPMS. The indirect TPMS measures the tire speed, and the operation status of the tire can be obtained by comparing the difference of the rotating speed. However, the indirect TPMS is not suitable for high speed traveling. The direct TPMS directly monitors the tire pressure and informs the vehicle direr when the tire pressure is abnormal. However, the responding speed of the direct TPMS is too slow in an extreme situation.

Furthermore, owing to the physical limitation of the tire pressure sensor, the indirect TPMS or the direct TPMS can only detect the operation status of the tire, therefore the application range is constrained. The message only from the tire pressure sensor cannot meet the increasing demand on mastering the whole vehicle information. Moreover, vehicle maintenance has been attracted more attention nowadays. Therefore, the interaction between the vehicle maintenance factory and the vehicle driver is getting more important.

Accordingly, in addition to provide the tire operation message with ease of use, high security and high responding speed, it also needs to provide a real-time and comprehensive vehicle message service between the vehicle maintenance factory and the vehicle driver.

SUMMARY

According to one aspect of the present disclosure, a vehicle message managing device is provided. The vehicle message managing device includes a tire sensor and a tire sensor setting tool. The tire sensor detects an operation status of a tire, generates an operation message and transmits the operation message outward. The tire sensor includes a storing module and a receiving module. The storing module stores the operation message. The receiving module is electrically connected to the storing module, wherein the receiving module receives a vehicle service message and the storing module stores the vehicle service message. The tire sensor setting tool includes a circuit board, a chip module, a memory, a low frequency transceiver, a high frequency transceiver, a power module and a display module, wherein the chip module is assembled on the circuit board, and the chip module is electrically connected to the memory, the low frequency transceiver, the high frequency transceiver, the power module and the display module, the high frequency transceiver receives the operation message, the memory stores a software program for processing the operation message and the vehicle service message, the chip module executes an instruction of the software program, the instruction includes: generating an user profile for storing the operation message and the vehicle service message; transmitting the operation message or the vehicle service message to a remote server through the chip module; transmitting the vehicle service message to the tire sensor through the low frequency transceiver, and writing the vehicle service message to the storing module.

In one embodiment, a method for setting a tire recycling using the aforementioned vehicle message managing device is provided, the method includes: scanning or taking the picture of the number on a tire skin using the lens module; inputting the tire buyer name, the tire seller name, the tire buyer address and the tire seller address; associating the number on the tire skin, the tire buyer name, the tire seller name, the tire buyer address and the tire seller address for generating a related data; transmitting the related data to the remote server; and performing the tire recycling in accordance with the related data.

In another embodiment, a method for setting a tire storing position using the aforementioned vehicle message managing device is provided, the method includes: providing a tire storing area, wherein the tire storing area includes a plurality of tire storing positions; storing a tire to one of the tire storing positions; inputting the tire storing position to the tire sensor setting tool; and transmitting the tire storing position to the tire sensor by the tire sensor setting tool, and storing the tire storing position to the storing module of the tire sensor.

According to another aspect of the present disclosure, a vehicle message managing method is provided. The vehicle message managing method includes: providing an operation message of a tire through a tire sensor; receiving the operation message through a tire sensor setting tool, or receiving at least one outer message through the tire sensor setting tool; transmitting at least one of the operation message and the outer message to a remote server; storing and analyzing at least one of the operation message and the outer message and generating an analyzing result.

According to still another aspect of the present disclosure, a vehicle message managing system is provided. The vehicle message system includes a tire sensor, a tire sensor setting tool and a remote server. The tire sensor detects an operation status of a tire, generates an operation message and transmits the operation message outward. The tire sensor setting tool receives the operation message and at least one outer message, and transmits at least one of the operation message and the outer message. The remote server receives at least one of the operation message and the outer message transmitted from the tire sensor setting tool, stores and analyzes at least one of the operation message and the outer message and generates an analyzing result.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
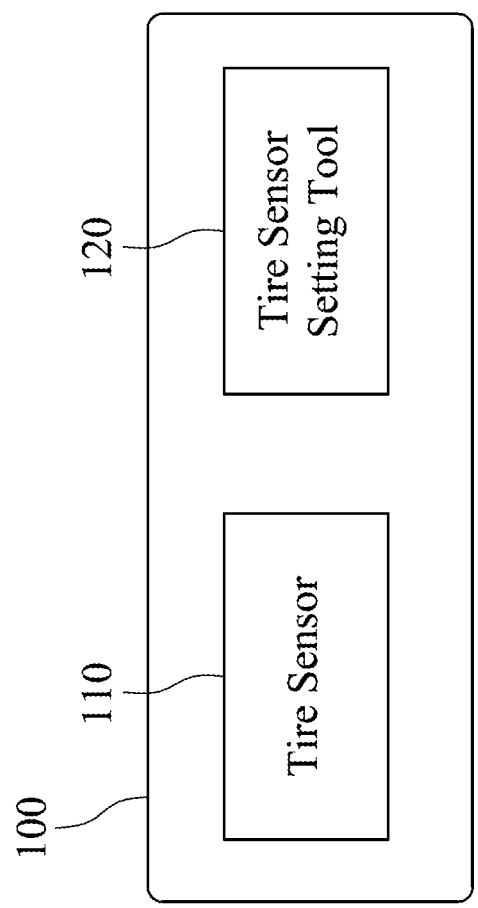
FIG. 1 is a schematic view showing a vehicle message managing device according to one embodiment of the present disclosure.
Figure 2:
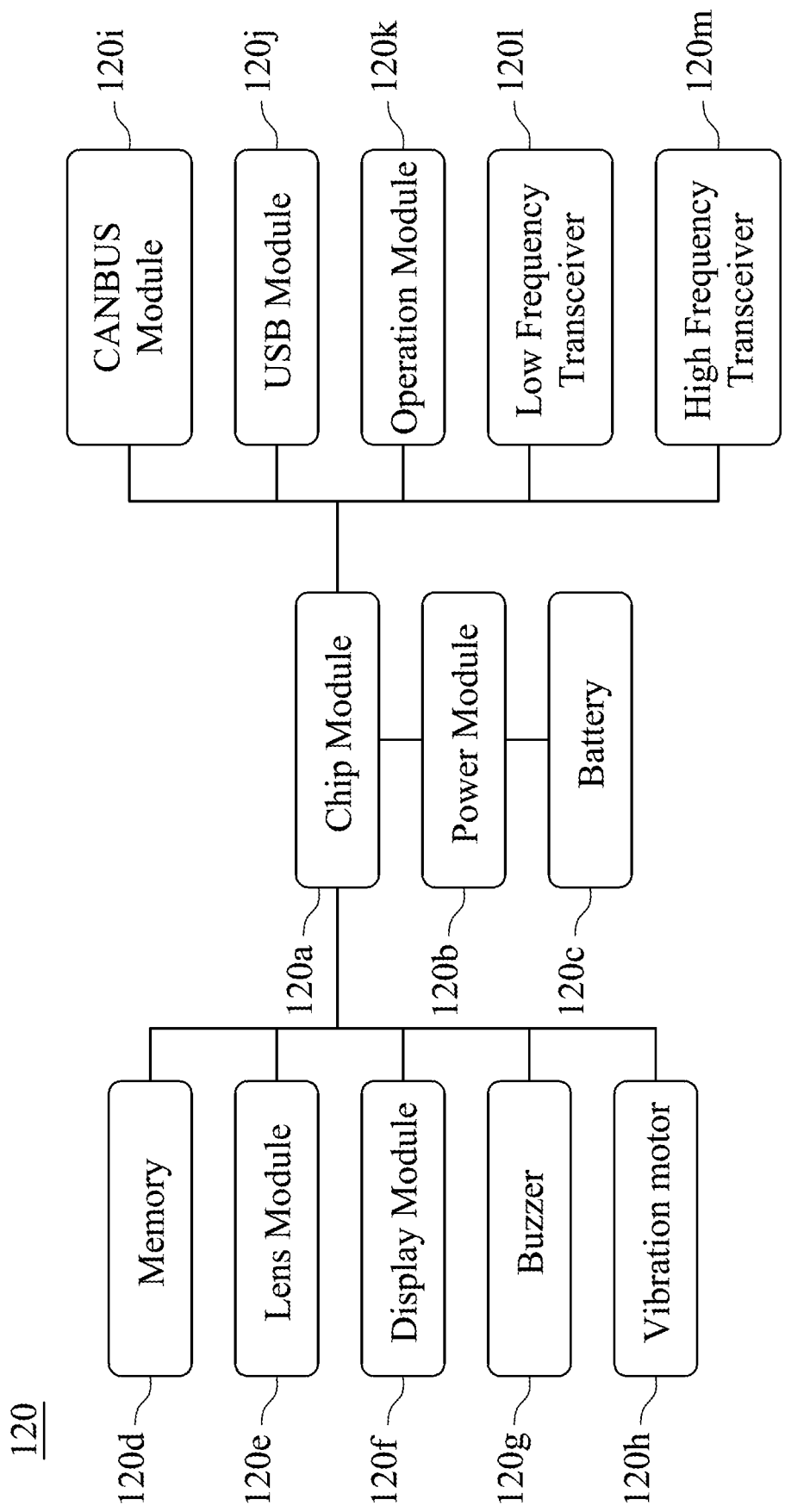
FIG. 2 is a block diagram showing a hardware architecture of the tire sensor setting tool of FIG. 1.
Figure 3:
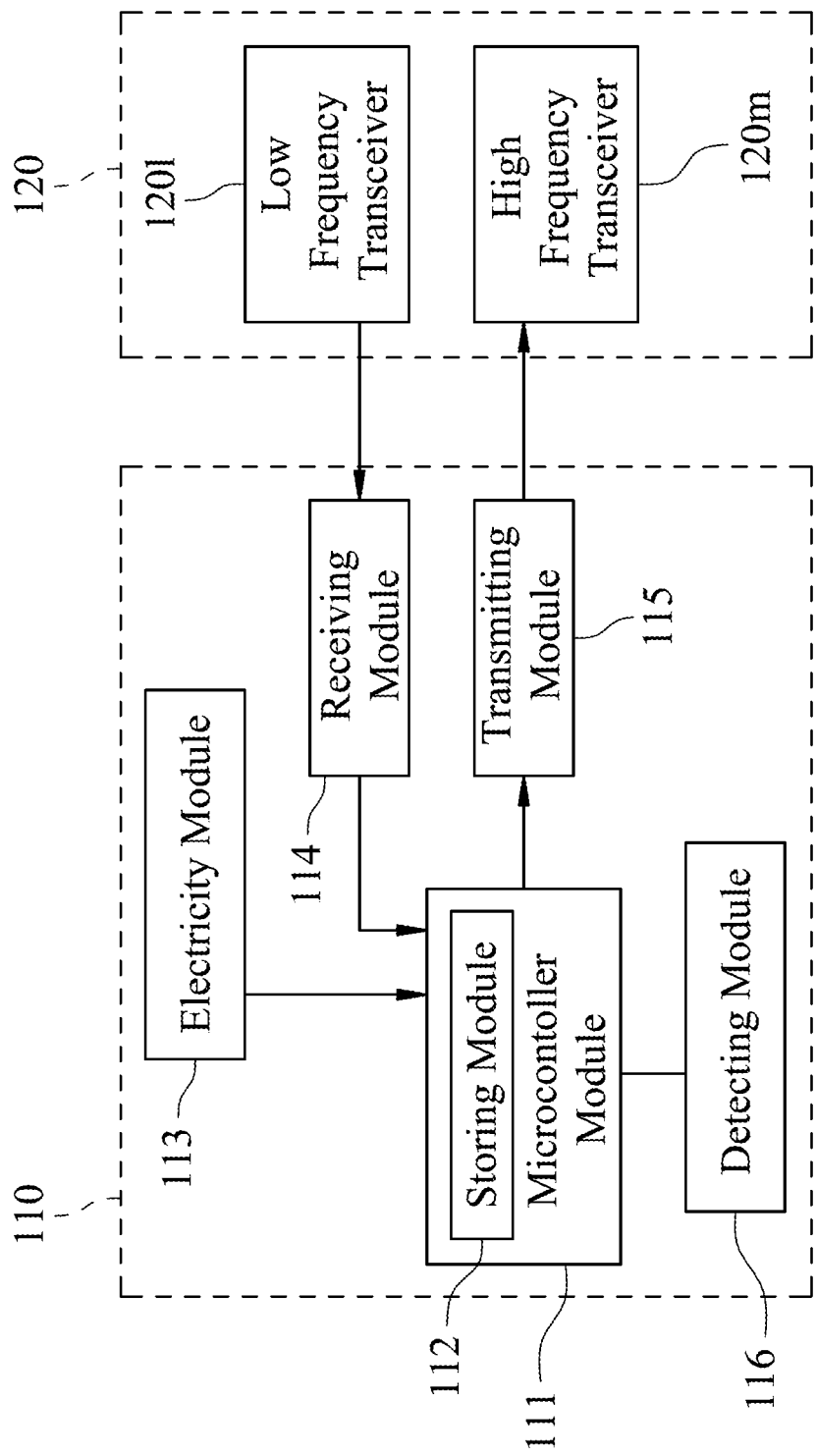
FIG. 3 is a block diagram showing a hardware architecture of the tire sensor of FIG. 1.
Figure 4:
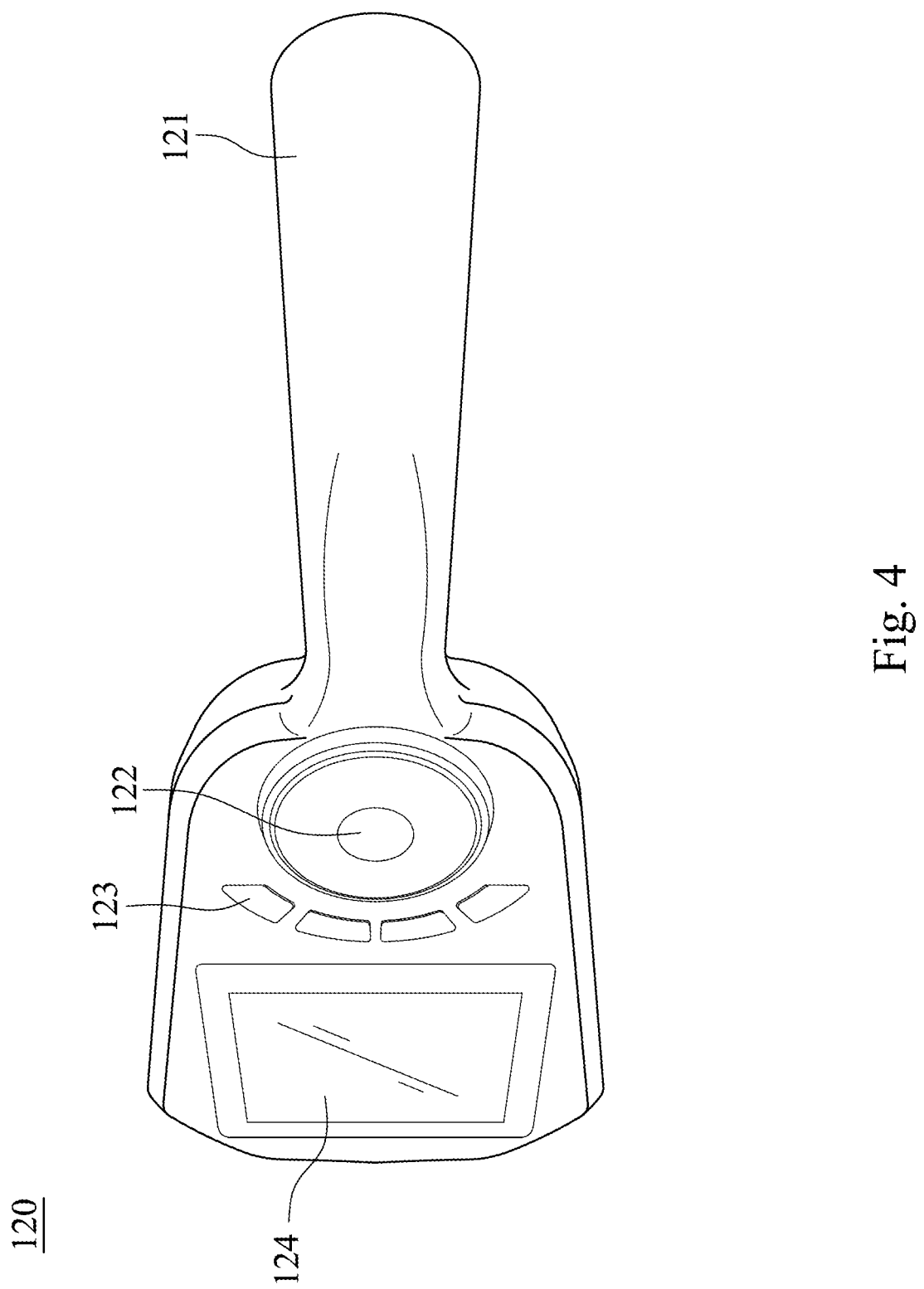
FIG. 4 is a schematic view showing an appearance of a real product of the tire sensor setting tool of FIG. 2.
Figure 5:
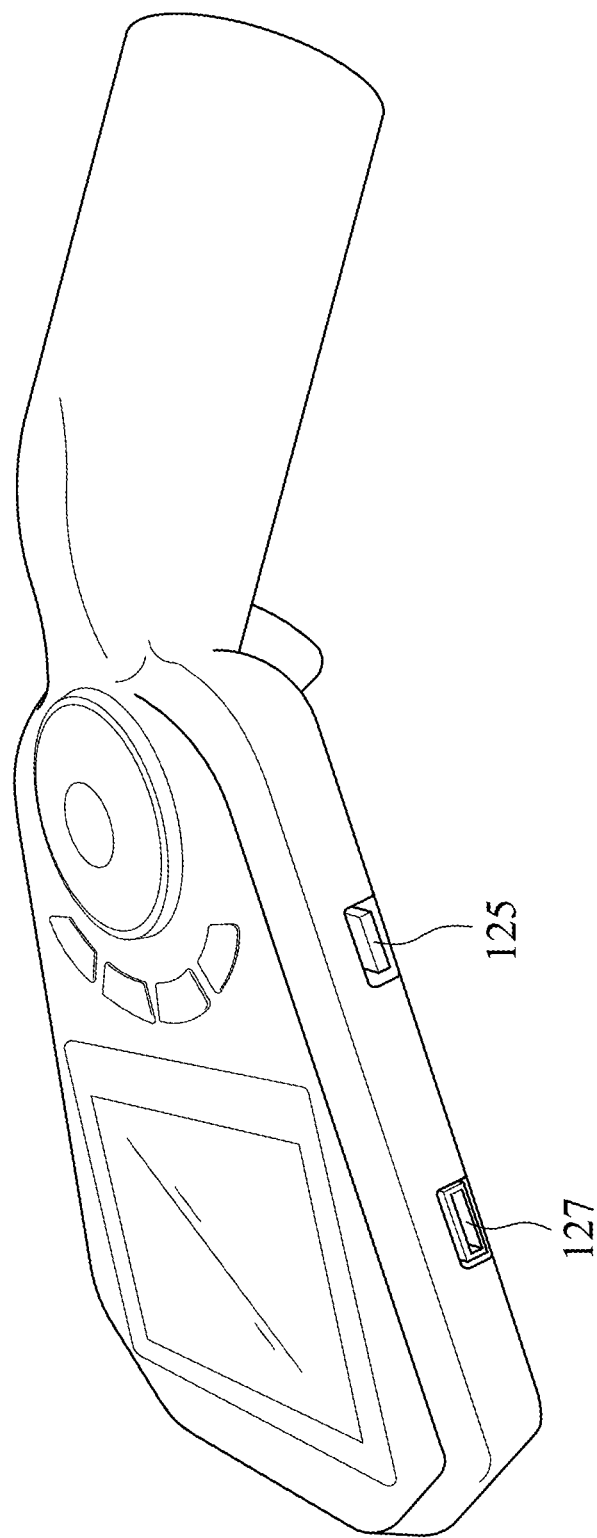
FIG. 5 illustrates a three-dimensional view of the real product of the tire sensor setting tool of FIG. 2.
Figure 6:
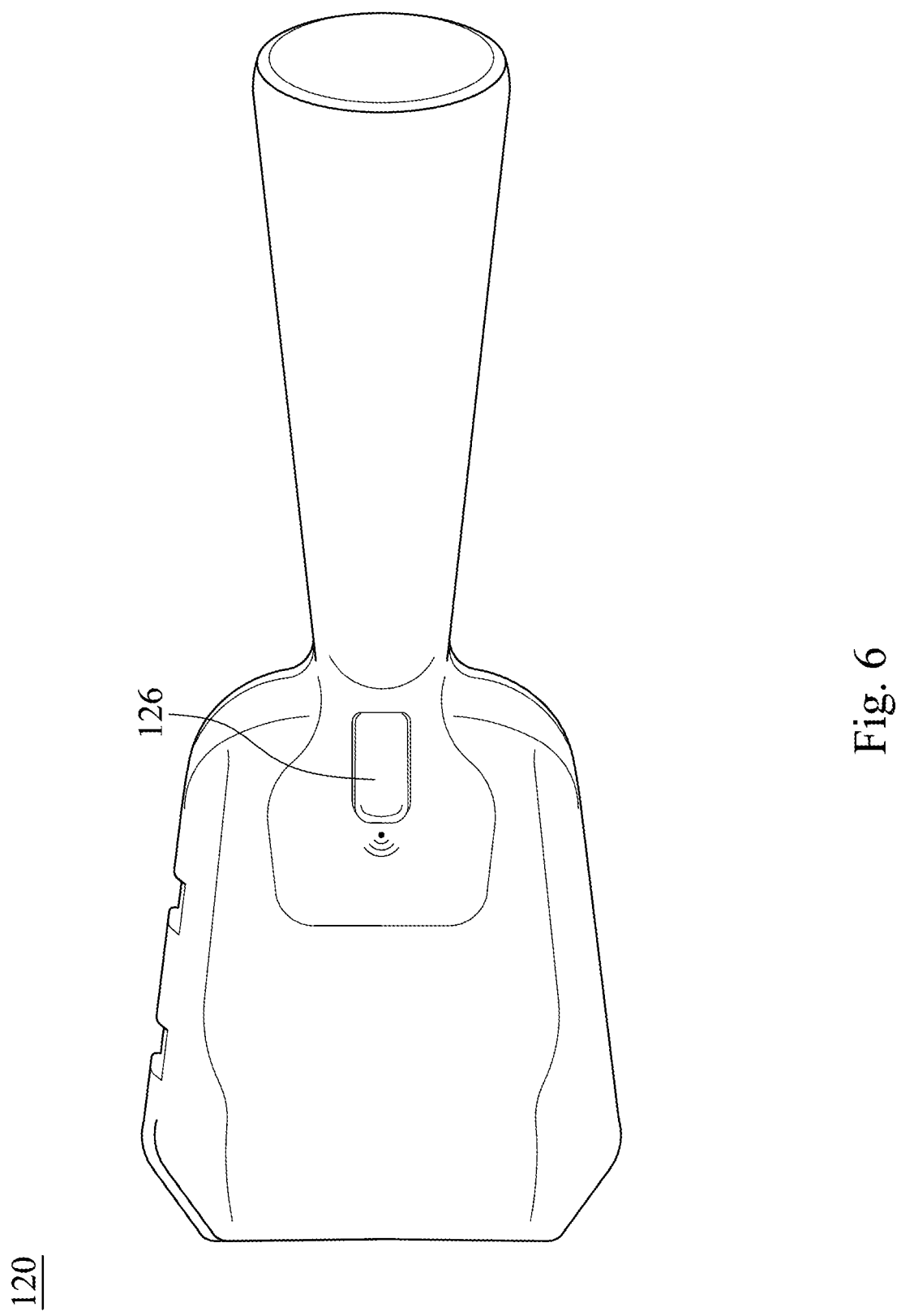
FIG. 6 illustrates another schematic view of the real product of the tire sensor setting tool of FIG. 2.

FIG. 1 is a schematic view showing a vehicle message managing device 100 according to one embodiment of the present disclosure; FIG. 2 is a block diagram showing a hardware architecture of the tire sensor setting tool 120 of FIG. 1; FIG. 3 is a block diagram showing a hardware architecture of the tire sensor 110 of FIG. 1; FIG. 4 is a schematic view showing an appearance of a real product of the tire sensor setting tool 120 of FIG. 2; FIG. 5 illustrates another view of the real product of the tire sensor setting tool 120 of FIG. 2; FIG. 6 illustrates still another view of the real product of the tire sensor setting tool 120 of FIG. 2.

In FIG. 1, a vehicle message managing device 100 includes a tire sensor 110 and a tire sensor setting tool 120. The tire sensor 110 can detect an operation status of a tire, generate an operation message and transmit the operation message outward. The tire sensor 110 includes a storing module 112 and a receiving module 114 (as shown in FIG. 3). The storing module 112 can store the operation message. The receiving module 114 is electrically connected to the storing module 112 and can receive a vehicle service message. The vehicle service message can be stored in the storing module 112. In FIG. 2, the tire sensor setting tool 120 include a circuit board (not shown). A chip module 120a is assembled on the circuit board and acted as a control center. The chip module 120a is electrically connected to a power module 120b, a memory 120d, a lens module 120e, a display module 120f, a buzzer 120g, a vibration motor 120h, a CANBUS module 120i, a USB module 120j, an operation module 120k, a low frequency (125 KHz) transceiver 120l and a high frequency (315 MHz/433 MHz) transceiver 120m.

The chip module 120a has logical operation functionality, and a wireless communication chip is integrated in the chip module 120a in order to exchange data with outer devices through various communication protocols (e.g., Wi-Fi, Bluetooth, etc.). For example, data can be exchanged with a remote server through a Wi-Fi communication protocol, or a mobile phone through a Bluetooth communication protocol.

The power module 120b provides required power to operate the hardware. In one example, a battery 120c can be used as a power source, but not limited thereto.

The memory 120d can store data, and a software program can be loaded therein for processing the vehicle service message and the operation message for the tire.

The lens module 120e can include lenses for scanning or taking a picture of a Bar code, a QR code or a number on a tire skin. The number on the tire skin can be a Tire ID, and the lens module 120e can scan the Tire ID or take a picture of the Tire ID, and output a photo to the chip module 120a. And then, the photo is recognized through an image processing software for obtaining the tire ID. At the time, a tire buyer name, a tire seller name, a tire buyer address and a tire seller address can be inputted through the operation module 120k or the display module 120f, can be associated with the tire ID to a file, and then the file can be saved to the memory 120d or can be transmitted to a remote server 140 by the chip module 120a. Furthermore, the tire ID, the tire buyer name, the tire seller name, the tire buyer address and the tire seller address can also be directly transmitted to the remote server 140 after being obtained through the tire sensor setting tool 120, and these data can be associated to generate an association data. When a tire seller or a tire manufacturer obtains the association data through the remote server 140, the location of the tire can be obtained. After a period of time, the file or the association data can be used for recycling the tire if required.

The display module 120f can include a touch input interface. The vehicle message, the tire message and the vehicle service message can be inputted through the touch input interface.

The low frequency (125 KHz) transceiver 120l can transmit a triggering signal to the tire sensor 110. The tire sensor 110 transmits back the operation message or the vehicle service message after receiving the triggering signal.

The high frequency (315 MHz/433 MHz) transceiver 120m can receive the operation message, and can process the operation message and the vehicle service message through the software program stored in the memory 120d. The chip module 120a executes an instruction of the software program. The instruction includes: generating a user profile for storing the operation message and the vehicle service message; transmitting the operation message and the vehicle service message to a remote server through the chip module 120a; transmitting the vehicle service message to the tire sensor 110, and writing the vehicle service message to the storing module 112.

The aforementioned tire sensor setting tool 120 can include a slot, an additional memory (e.g. SD card) can be plugged into the slot for storing the operation message or the vehicle service message.

The aforementioned vehicle service message can include a vehicle message, a tire message and a vehicle service preference message.

The aforementioned tire message can include the tire ID. The aforementioned vehicle service preference message can include a tire buyer name, a tire seller name, a tire buyer address and a tire seller address, wherein the tire ID, the tire buyer name, the tire seller name, the tire buyer address and the tire seller address are transmitted to the remote server by the chip module 120a.

The aforementioned CANBUS module 120i can be used to connect with a computer of the vehicle or a receiving device of the tire sensor 110.

The USB module 120j can be used to connect with an outer mobile phone or a computer.

The operation module 120k can make a functional confirmation through operation a button or a knob.

The buzzer 120g and the vibration motor 120h can generate warning sound or vibration while an error occurred.

In FIG. 3, in addition to the storing module 112 and the receiving module 114, the tire sensor 110 can further include a microcontroller module 111, an electricity module 113, a transmitting module 115 and a detecting module 116. The electricity module 113, the transmitting module 115, the receiving module 114 and the detecting module 116 are all electrically connected to the microcontroller module 111. The detecting module 116 can include a pressure sensor, at least one acceleration sensor, a temperature sensor and a magnetic field sensor. The detecting module 116 can be controlled by the microcontroller module 111 for detecting parameters such as a pressure, acceleration, a direction changing, a temperature and an environmental magnetic field of the tire, and the detecting result is transmitted to the microcontroller module 111. The transmitting module 115 can be controlled by the microcontroller module 111 for wirelessly transmitting the detecting result from the detecting module 116 to a detecting system in a vehicle or the tire sensor setting tool 120. Preferably, the transmitting module 115 is a RF transmitter; the detecting result is transmitted to the detecting system in the vehicle or the tire setting tool 120 through radio frequency such as 315 MHz or 433 MHz. The electricity module 113 provides required electric power to each module in the tire sensor 110. In other word, messages can be exchanged between the receiving module 114, the transmitting module 115 of the tire sensor 110 and the low frequency transceiver 120l, the high frequency transceiver 120m of the tire sensor setting tool 120.

FIG. 4 is a schematic view showing an appearance of a real product of the tire sensor setting tool 120 of FIG. 2; FIG. 5 illustrates a three-dimensional view of the real product of the tire sensor setting tool 120 of FIG. 2; FIG. 6 illustrates another schematic view of the real product of the tire sensor setting tool 120 of FIG. 2.

In FIG. 4, the tire sensor setting tool 120 includes a handle 121, a button 122 (can be a confirmation button or a return button), a function selection button 123 and a touch input interface 124. The function of the button 122 and the function selection button 123 can be varied with different software. In FIG. 5, a connection port 125 can be used to connect with an outer mobile phone or a computer. A plug 127 can be used to insert an additional memory (e.g. a SD card). In FIG. 6, a button 126 can be used to confirm the function selection or trigger the tire sensor 110. It should be known that the real product structure of the tire sensor setting tool 120 is not limited within that disclosed in the disclosure, another kind of structure can possibly be constructed.

Figure 7:
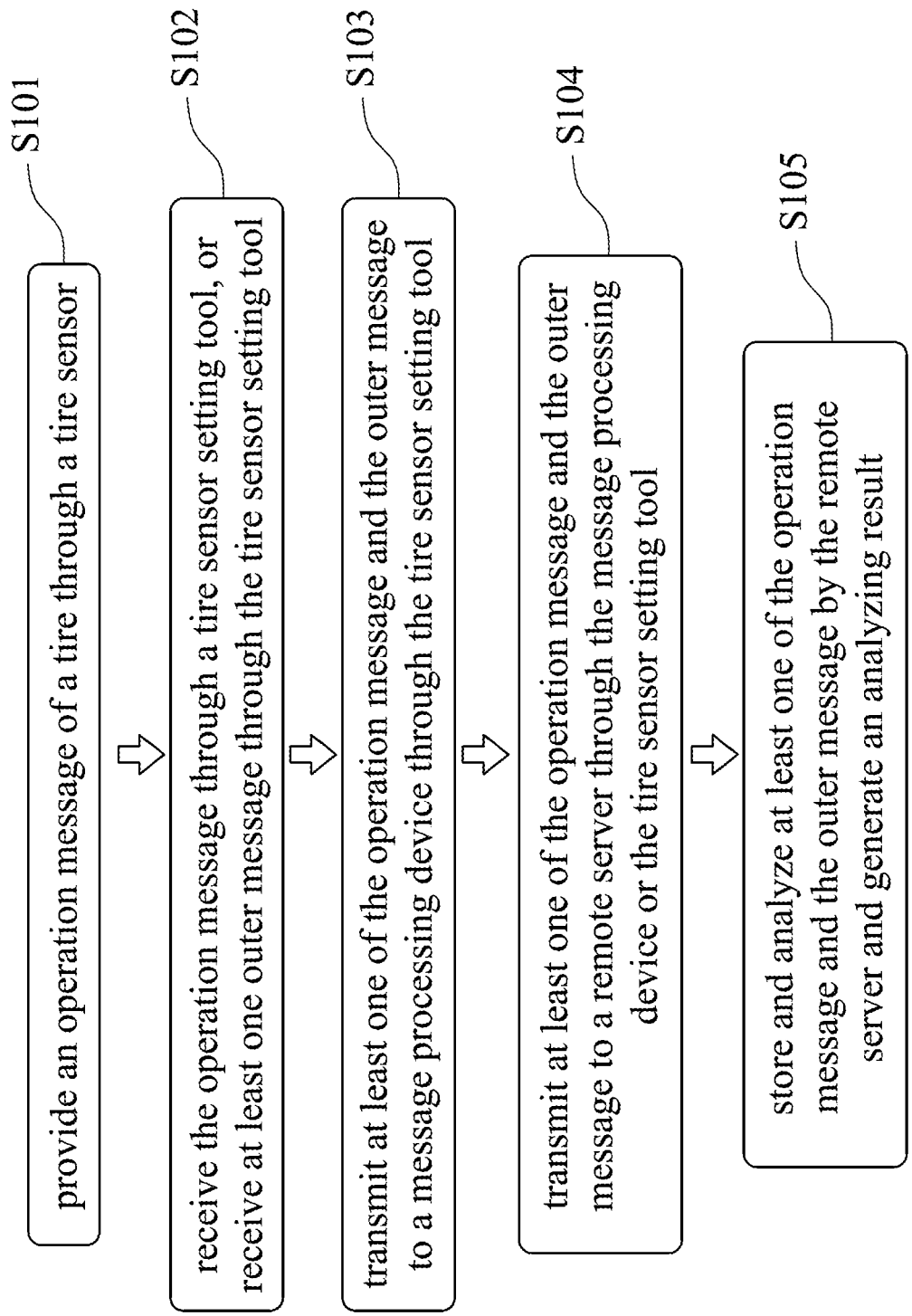
FIG. 7 is a flow chart of a vehicle message managing method according to another embodiment of the present disclosure.

FIG. 7 is a flow chart of a vehicle message managing method according to another embodiment of the present disclosure. In FIG. 7, the vehicle message managing method includes: a step S101 for providing an operation message of a tire through a tire sensor; a step S102 for receiving the operation message through a tire sensor setting tool, or receiving at least one outer message through the tire sensor setting tool; a step S103 for transmitting at least one of the operation message and the outer message to a message processing device through the tire sensor setting tool; a step S104 for transmitting at least one of the operation message and the outer message to a remote server through the message processing device or the tire sensor setting tool; a step S105 for storing and analyzing at least one of the operation message and the outer message by the remote server and generating an analyzing result. The aforementioned tire sensor setting tool 120 can receive a plurality of outer messages and transmits the outer messages back to the tire sensor 110. The operation message and the outer message can also be matched and analyzed in the remote server and a matching result can be transmitted to the tire sensor setting tool 120 or the message processing device through the remote server. The operation principle of the aforementioned vehicle message managing method will be described in more detail.

Figure 8:
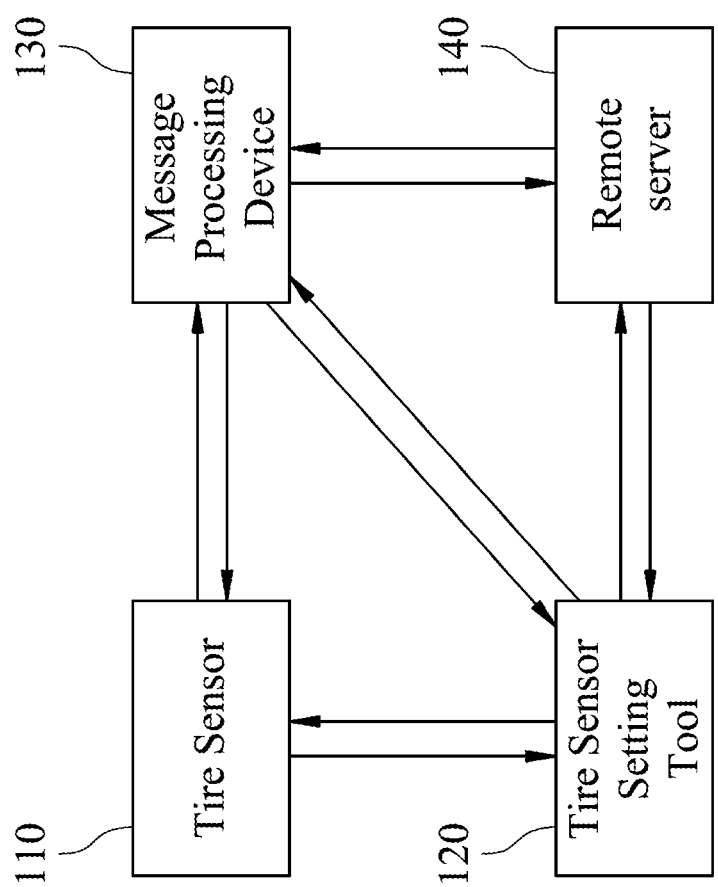
FIG. 8 is a block diagram of a vehicle message managing system according to still another embodiment of the present disclosure.
Figure 9:
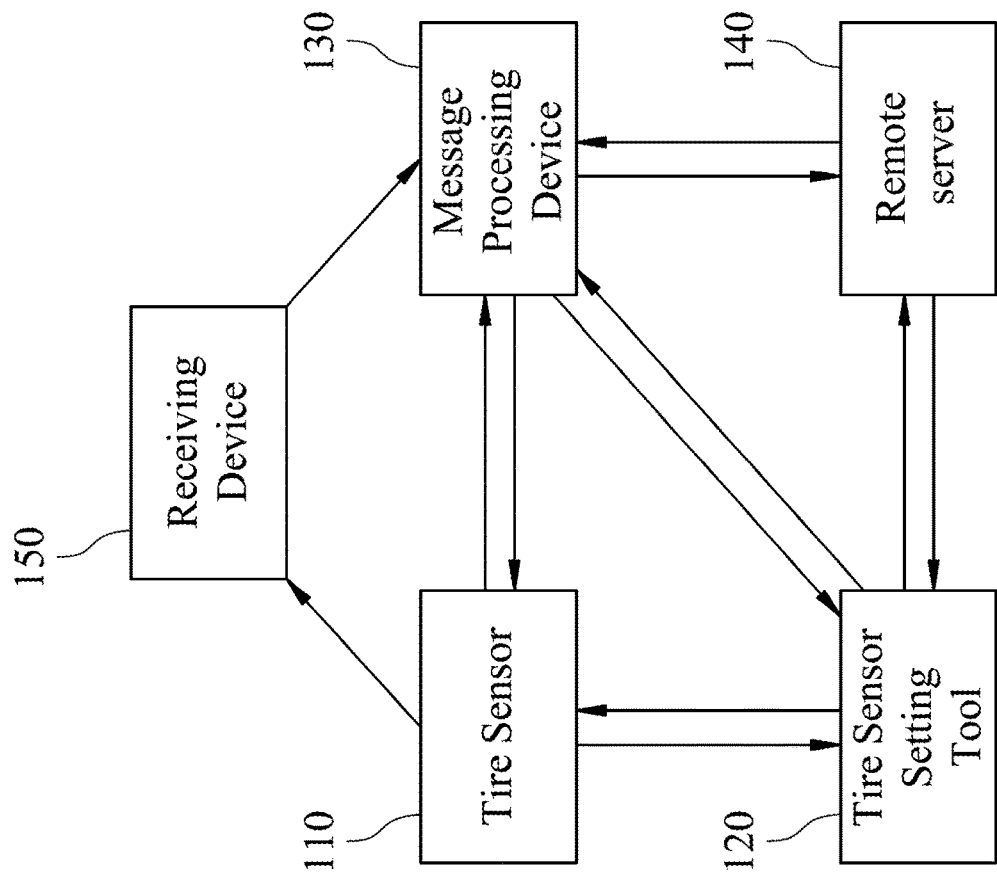
FIG. 9 is a block diagram of a vehicle message managing system according to still another embodiment of the present disclosure.

FIG. 8 is a block diagram of a vehicle message managing system according to still another embodiment of the present disclosure; FIG. 9 is another block diagram of a vehicle message managing system according to still another embodiment of the present disclosure. In the following paragraph, the difference between FIG. 8 and FIG. 9 will be described in more detail.

In FIG. 8, a vehicle message managing system includes a tire sensor 110, a tire sensor setting tool 120, a message processing device 130 and a remote server 140. The tire sensor 110 detects an operation status of a tire, generates an operation message and transmits the operation message outward. The tire sensor setting tool 120 receives the operation message and at least one outer message, and transmits at least one of the operation message and the outer message. The message processing device 130 receives at least one of the operation message and the outer message, and then transmits these messages to the remote server 140. The tire sensor setting tool 120 can also directly transmit at least one of the operation message and the outer message to the remote server 140. The remote server 140 stores and analyzes at least one of the operation message and the outer message and generates an analyzing result.

The aforementioned tire sensor 110 in the present disclosure is broadly defined as hardware capable of detecting any kind of operation status of the tire, not only the pressure of the tire. Therefore, the operation messages can include a tire pressure, a tire temperature, an electricity quantity of the tire sensor 110 and a sensor ID. The sensor ID is an identification number of the tire sensor 110.

The aforementioned outer messages received by the tire sensor setting tool 120 can include a tire sensor setting tool ID, a tire sensor ID, a tire traveling mileage, a tire pattern depth, a load, a tire ID, a tire brand, a tire type, a tire installation time, a tire installation location, a tire sensor installation time, a tire sensor installation location, a tire installation factory location, a vehicle manufacturer name, a vehicle name, a vehicle type, a vehicle age, a vehicle number, a tire repairing factory location, a tire ID, a tire rim serial number, an employee number and ID of a maintenance staff, a tire storing position, a tire agent name, a tire reseller name, a tire agent address, a tire reseller address, a tire buyer name, a tire buyer address, a vehicle owner name, a vehicle owner address, a position of the tire on a shelf, a shelf number, an advertisement of the tire repairing factory or the manufacturer of the tire sensor setting tool and a traffic condition.

The difference between the operation message and the outer message are then described. The tire sensor 110 is used to detect the operation status of the tire and has three types: a built-in type, an external type and a attach type. However, no matter how the functions of the tire sensor 110 extended, a physical limit still exists. This is due to the tire sensor 110 only detects physical quantity while operating the tire. The application field will be limited when only the operation message of the tire is available. In the present disclosure, in addition to the operation message transmitted from the tire sensor 110, the tire sensor setting tool 120 also receives the outer message. The outer message includes the contents that are not included in the operation message. In other word, in addition to the received operation message, the received outer message can also be stored in the tire sensor setting tool 120. In more detail, the outer message is inputted into the tire sensor setting tool 120 through a touch input interface 124 or a scan interface. For example, the aforementioned outer messages such as the tire brand, the tire type, the tire installation time, the tire installation factory location, the vehicle manufacturer name, the vehicle name, the vehicle age and the tire repairing factory location can be inputted as texts through the touch input interface 124 as in FIG. 4, or can be inputted into the tire sensor setting tool 120 by scanning the pre-built barcode or the QR code through the lens module 120e or an infrared ray.

The tire sensor setting tool 120 can transmit the operation message/outer message to the message processing device 130 through a wire channel (e.g. a network cable) or a wireless channel (e.g. Wi-Fi, Bluetooth, 3G/4G/5G or other wireless communication protocols). The message processing device 130 can be a mobile phone, a tablet, a Notebook or a desktop computer. And then, the operation message/outer message can be wired or wirelessly transmitted to the remote server 140 for storing and analyzing. The message processing device 130 can transmit back the analyzing result to the tire sensor setting tool 120. Therefore, an owner of the tire sensor setting tool 120 can receive the analyzing result and can obtain the operation information of the tire and the other related messages, thus a customized service can be provided.

FIG. 9 is a block diagram of a vehicle message managing system according to still another embodiment of the present disclosure. In FIG. 9, a receiving device 150 is introduced for providing more comprehensive services. The operation message in the tire sensor 110 can also be received by the receiving device 150, and can be transmitted to the message processing device 130 by the receiving device 150 through a wireless channel. The receiving device 150 can be a vehicle computer (ECU) or a TPMS host used for receiving the message from the tire sensor 110. The message processing device 130 can be a mobile phone, a tablet or a Notebook but not limited. And then, the operation message can be transmitted to the remote server 140 for storing and analyzing. Furthermore, the outer message received by the tire sensor setting tool 120 can be transmitted back to the tire sensor 110 through a wireless channel and can be transmitted outward through the receiving device 150, or the outer message can be directly transmitted to the remote server 140 from the tire sensor setting tool 120. Finally, the operation message and the outer message can be transmitted to the remote server 140 for analyzing or matching, and the analyzing/matching result can be transmitted back to the message processing device 130 or the tire sensor setting tool 120. Thereby, the owner of the message processing device 130 (e.g. a mobile phone or a computer) or the tire sensor setting tool 120 can obtain the relative message service in accordance with the analyzing/matching result.

The operation principle and the required software/hardware of the vehicle message managing device, method and system have been described in the aforementioned paragraphs. In the following paragraphs, various application types will be described.

Figure 10:
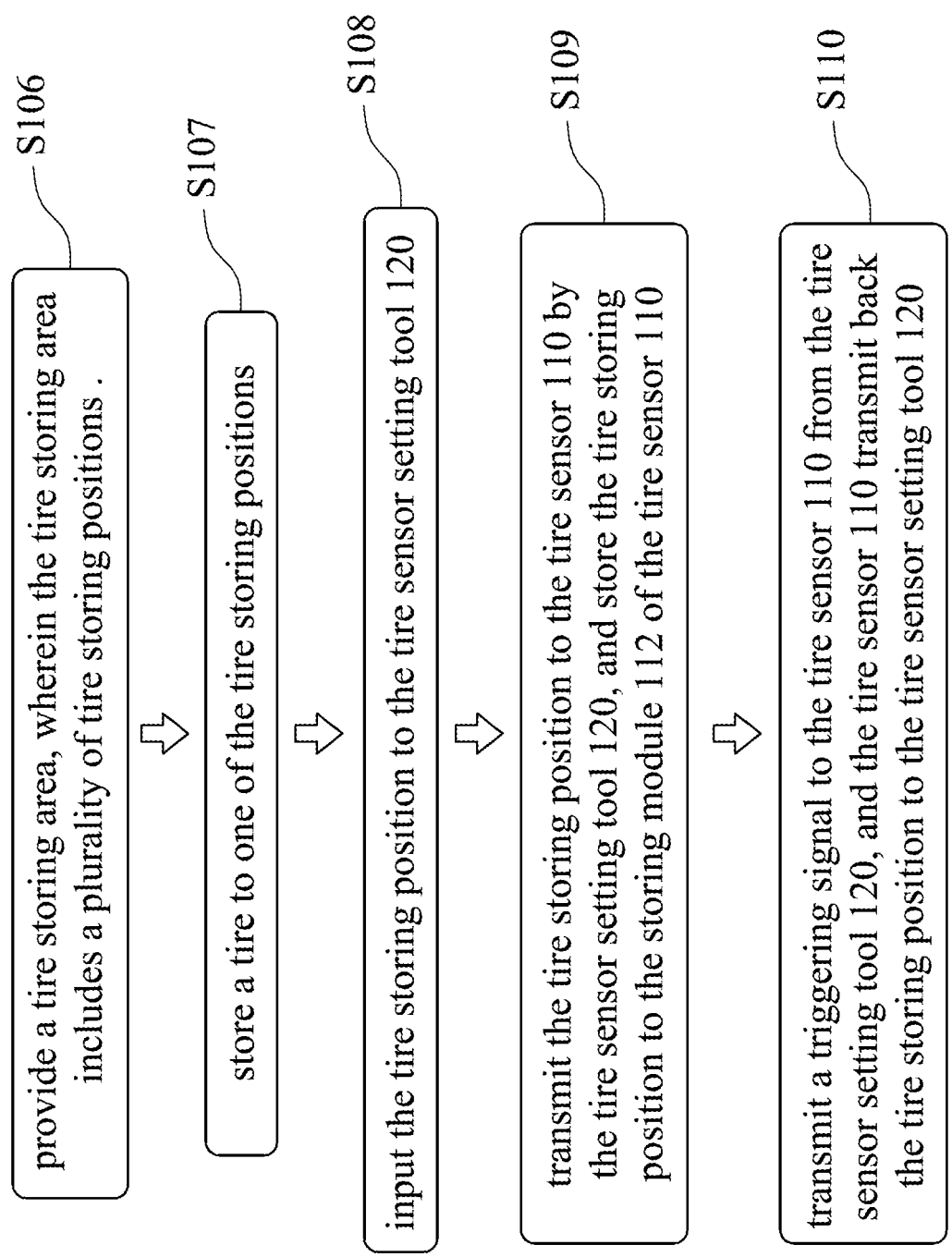
FIG. 10 is a flow chart of a method for setting a tire storing position according to one embodiment of the present disclosure.

In one example, the tire sensor 110 and the receiving device 150 (e.g. ECU of a vehicle) is equipped in a vehicle (e.g. a car), and the tire sensor setting tool 120 is owned by a tire repairing factory (e.g. a vehicle maintenance factory, a tire dealer, etc.), and the message processing device 130 (e.g. a mobile phone, a desktop computer, etc.) can also be owned by the tire repairing factory. Furthermore, the message processing device 130 can also be a mobile phone owned by a vehicle driver. Accordingly, various application types can be formed. The vehicle service message or the outer message includes the following content that is point (a) to point (i). For example: (a) in winter, the tire in summer is replaced and put on the shelf, a position of the tire on the shelf is inputted into the tire sensor setting tool 120, and then the position of the tire is transmitted to the tire sensor 110 and is stored. When the tire is changed next time, the tire sensor setting tool 120 can be used to read the position of the tire stored in the tire sensor 110; an example is shown in FIG. 10, FIG. 10 is a flow chart of a method for setting a tire storing position according to one embodiment of the present disclosure, the method includes: a step S106 for providing a tire storing area, wherein the tire storing area includes a plurality of tire storing positions; a step S107 for storing a tire to one of the tire storing positions; a step S108 for inputting the tire storing position to the tire sensor setting tool 120; a step S109 for transmitting the tire storing position to the tire sensor 110 by the tire sensor setting tool 120, and storing the tire storing position to the storing module 112 of the tire sensor 110; a step S110 for transmitting a triggering signal to the tire sensor 110 from the tire sensor setting tool 120, and transmitting back the tire storing position to the tire sensor setting tool 120 from the tire sensor 110; (b) a number of a maintenance staff can be inputted into the tire sensor setting tool 120, and then is transmitted to the tire sensor 110 and is stored. When going back to the factory for repairing, the number of the maintenance staff can be obtained through reading the tire sensor 110 by the tire sensor setting tool 120; (c) the messages transmitted from the tire sensor 110 can be received by a mobile phone of a vehicle driver, and can be transmitted to the remote server 140 for analyzing, and then an analyzing result can be transmitted back to the mobile phone of the vehicle driver, therefore the vehicle driver can make immediate judgment for avoiding danger; (d) since the outer message can be transmitted from the tire sensor setting tool 120 to the tire sensor 110, and then transmitted to the mobile phone of the vehicle driver from the tire sensor 110; or the outer message can be transmitted to the mobile phone of the vehicle driver directly from the tire sensor setting tool 120, therefore the outer message can be integrated to the pre-installed software program of the mobile phone of the vehicle driver (e.g. GPS map, communication software, etc.), and the vehicle driver can transmit his recommended repairing factory to another vehicle driver; (e) when combining a online payment function, the vehicle driver can pay online first, and can connect to the tire repairing factory, therefore the payment is not required when going back to the tire repairing factory; (f) the tire repairing factory can receive the operation message (e.g. tire pressure, tire temperature, etc.) and the outer message (e.g. tire brand, tire type, shelf number, etc.), therefore the vehicle driver can obtain customized service when replacing or repairing the tire; (g) the tire repairing factory can be ranked through the mobile phone of the vehicle driver, and the ranking can be transmitted to another vehicle driver by using the communication software; (h) by the receiving device 150 equipped in the vehicle, the message processing device 130 or the tire sensor setting tool 120 can be inputted extra messages (e.g. the advertisement of the tire repairing factory or the manufacturer of the tire sensor setting tool 120) and can be shown off; (i) a traffic condition (car accident, traffic jam, etc.) can be transmitted to another vehicle through the receiving device 150 or the remote server 140.

Furthermore, a method for setting a tire recycling using the aforementioned vehicle message managing device 100 is provided in the present disclosure, the method includes: scanning or taking the picture of the number on a tire skin using the lens module 120e; inputting the tire buyer name, the tire seller name, the tire buyer address and the tire seller address to the tire sensor setting tool 120; associating the number on the tire skin, the tire buyer name, the tire seller name, the tire buyer address and the tire seller address for generating a related data; transmitting the related data to the remote server 140; and performing the tire recycling in accordance with the related data.

The aforementioned embodiments demonstrate various application types combining the tire sensor setting tool 120, the tire sensor 110 and the remote server 140. Therefore, the vehicle message managing device, the vehicle message managing method and the vehicle message managing system in the present disclosure can not only provide the operation message of the tire, but also can provide an instant and comprehensive message service to the vehicle driver.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A vehicle message managing device, comprising:
a tire sensor detecting an operation status of a tire, generating an operation message indicating the detected operation status of the tire, and transmitting the operation message outward, the tire sensor comprising:
a storing module storing the operation message; and
a receiving module electrically connected to the storing module; and
a tire sensor setting tool that is possessed by a tire repairing factory or a manufacturer of the tire sensor setting tool and comprises a circuit board, a chip module, a memory, a low frequency transceiver, a high frequency transceiver, a power module, an operation module, a handle, a slot, an embedded memory and a display module, wherein the chip module is assembled on the circuit board, and the chip module is electrically connected to the memory, the low frequency transceiver, the high frequency transceiver, the power module and the display module, the high frequency transceiver receives the operation message, the memory stores a software program for processing the operation message and a vehicle service message which is able to be inputted through the operation module or the display module and comprises one of a vehicle message, a tire ID and a vehicle service preference message, the embedded memory is plugged into the slot for storing the operation message or the vehicle service message, the chip module executes instructions from the software program, the instructions comprise:
generating a user profile for storing the operation message and the vehicle service message;
transmitting the operation message or the vehicle service message to a remote server through the chip module directly; and
receiving an analyzing result according to at least one of the operation message and the vehicle service message from the remote server;
wherein, the operation message, the vehicle service message, or the analyzing result can be transmitted to a message processing device possessed by a vehicle driver or the tire repairing factory from the tire sensor setting tool or the tire sensor.

2. The vehicle message managing device of claim 1, wherein the vehicle service preference message comprises at least one of a tire buyer name, a tire seller name, a tire buyer address and a tire seller address, wherein at least one of the tire ID, the tire buyer name, the tire seller name, the tire buyer address and the tire seller address are transmitted to the remote server by the chip module.

3. The vehicle message managing device of claim 1, wherein the display module comprises a touch input interface for inputting the vehicle message, the tire ID and the vehicle service preference message.

4. The vehicle message managing device of claim 1, wherein the tire sensor further comprises a microcontroller module, a power module, a transmitting module and a detecting module, the power module, the transmitting module, the receiving module and the detecting module are electrically connected to the microcontroller module, and wherein the receiving module receives a vehicle service message and the storing module stores the vehicle service message.

5. The vehicle message managing device of claim 1, wherein the tire sensor setting tool comprises a lens module, the lens module scans or takes a picture of a bar code, a QR code or a number on a tire skin.

6. A method for setting a tire recycling using the vehicle message managing device of claim 5, the method comprising:
scanning or taking the picture of the number on a tire skin using the lens module;
inputting at least one of the tire buyer name, the tire seller name, the tire buyer address and the tire seller address using the tire sensor setting tool;
associating the number on the tire skin with the at least one of the tire buyer name, the tire seller name, the tire buyer address and the tire seller address for generating a related data;

transmitting the related data to the remote server using the tire sensor setting tool; and performing the tire recycling in accordance with the related data.

7. The vehicle message managing device of claim 1, wherein the low frequency transceiver transmits a triggering signal to the tire sensor, and the tire sensor transmits back the operation message or the vehicle service message after receiving the triggering signal.

8. A vehicle message managing device, comprising:

a tire sensor detecting an operation status of a tire, generating an operation message indicating the detected operation status of the tire, and transmitting the operation message outward, the tire sensor comprising:

a storing module storing the operation message; and a receiving module electrically connected to the storing module; and, a tire sensor setting tool that is outside a vehicle and possessed by a tire repairing factory or a manufacturer of the tire sensor setting tool, comprising a circuit board, a chip module, a memory, a low frequency transceiver, a high frequency transceiver, a power module, an operation module, a handle, a slot, an embedded memory and a display module, wherein the chip module is assembled on the circuit board, and the chip module is electrically connected to the memory, the low frequency transceiver, the high frequency transceiver, the power module and the display module, the high frequency transceiver receives the operation message, the memory stores a software program for processing the operation message and a vehicle service message which is able to be inputted through the operation module or the display module and comprises one of a vehicle message, a tire ID and a vehicle service preference message, the embedded memory is plugged into the slot for storing the operation message or the vehicle service message, the chip module executes instructions from the software program, the instructions comprise:

generating a user profile for storing the operation message and the vehicle service message;

transmitting the operation message or the vehicle service message to a remote server through the chip module directly; and receiving an analyzing result according to at least one of the operation message and the vehicle service message from the remote server or from a message processing device so as to obtain a relative message service in accordance with the analyzing result;

wherein the vehicle service message comprises at least one of a vehicle message, a tire message and a vehicle service preference message.

9. The vehicle message managing device of claim 8, wherein the instructions further comprise transmitting the vehicle service message to the tire sensor so as to be stored in the storing module of the tire sensor.

10. The vehicle message managing device of claim 9, wherein, the tire sensor further comprises a transmitting module to transmit the vehicle service message to a receiving device equipped in a vehicle.

11. The vehicle message managing device of claim 8, wherein the message processing device obtains the analyzing result from the remote server.

\* \* \* \* \*